(12) United States Patent
Volpato et al.

(10) Patent No.: US 11,285,680 B2
(45) Date of Patent: Mar. 29, 2022

(54) APPARATUS FOR FINE AND CONTROLLED ADJUSTMENT OF AN INJECTION MOLDING PROCESS AND RELATED INDUSTRIAL PROCESS

(71) Applicant: Afros S.p.A.

(72) Inventors: Marco Volpato, Caronno Pertusella (IT); Alberto Bonansea, Caronno Pertusella (IT)

(73) Assignee: AFROS S.P.A., Caronno Pertusella (IT)

( * ) Notice: Subject to any disclaimer, the term of this patent is extended or adjusted under 35 U.S.C. 154(b) by 508 days.

(21) Appl. No.: 16/184,643

(22) Filed: Nov. 8, 2018

(65) Prior Publication Data

US 2019/0152169 A1 May 23, 2019

(30) Foreign Application Priority Data

Nov. 22, 2017 (EP) ..................... 17203089

(51) Int. Cl.
*B29C 70/48* (2006.01)
*B29C 70/54* (2006.01)
(Continued)

(52) U.S. Cl.
CPC .............. *B29C 70/54* (2013.01); *B29C 45/02* (2013.01); *B29C 45/53* (2013.01); *B29C 45/54* (2013.01);
(Continued)

(58) Field of Classification Search
CPC ............ B29C 45/542; B29C 2045/824; B29C 48/475; B29C 2945/76207;
(Continued)

(56) References Cited

U.S. PATENT DOCUMENTS 2,359,840 A * 10/1944 Goessling ............... B29C 45/23
425/146
5,623,984 A * 4/1997 Nozaki .................. B22D 17/32
164/120

(Continued)

FOREIGN PATENT DOCUMENTS

EP    0 080 698 A2    6/1983
GB    2 101 034 A     1/1983

OTHER PUBLICATIONS

European Patent Office, "Search Report" in application No. EP 17 20 3089, dated May 16, 2018, 2 pages.

*Primary Examiner* — Matthew J Daniels
(74) *Attorney, Agent, or Firm* — Hickman Becker Bingham Ledesma LLP; Malgorzata A. Kulczycka

(57) ABSTRACT

The invention relates to an apparatus for fine and controlled adjustment of an injection molding process and a related industrial process.
The apparatus (1) has a sealed mold (2) supplied with fluid reactive resin via a supply inlet (8) and by means of a mixing and injection head (9) so as to impregnate with said resin fibers of composite material loaded inside a cavity (6) of the mold (2) and wherein at least one storage container (10) having an inlet/outlet opening (11) in fluid communication with an outlet (13) of said injection head (9) is provided so as to store a predefined quantity of fluid resin inside a storage chamber (16) prior to completion of the injection phase. Advantageously, the storage container (10) is a cylinder (18) defining internally a storage chamber (16) which houses slidably inside it a plunger (21) operated by an actuator (25) configured as a cylinder/piston assembly arranged as a coaxial extension of said cylinder (18) and comprising an actuating piston (15) having a stem (22) coinciding with the stem of said plunger (21); the cylinder
(Continued)

(18) of the storage chamber (16) and the cylinder (14) of said actuator (25) having cross-sections different from each other.

15 Claims, 8 Drawing Sheets

(51) Int. Cl.
*B29C 45/54* (2006.01)
*B29C 45/02* (2006.01)
*B29C 45/53* (2006.01)
B29K 307/04 (2006.01)
B29B 7/76 (2006.01)

(52) U.S. Cl.
CPC ............ *B29C 70/48* (2013.01); *B29C 70/548* (2013.01); *B29B 7/76* (2013.01); *B29K 2307/04* (2013.01)

(58) Field of Classification Search
CPC .......... B29C 2945/76685; B29C 70/54; B29C 70/48; B29C 45/021; B29C 45/022
See application file for complete search history.

(56) References Cited

U.S. PATENT DOCUMENTS

| 7,810,444 | B2 | 10/2010 | Sultan et al. | |
|---|---|---|---|---|
| 2005/0185504 | A1* | 8/2005 | Womer | B29C 45/74 366/79 |
| 2009/0309251 | A1* | 12/2009 | DuFaux | B29C 48/02 264/75 |

* cited by examiner

APPARATUS FOR FINE AND CONTROLLED ADJUSTMENT OF AN INJECTION MOLDING PROCESS AND RELATED INDUSTRIAL PROCESS

BENEFIT CLAIM

This application claims the benefit of European application 17203089.2, filed Nov. 22, 2017, the entire contents of which are hereby incorporated by reference for all purposes as if fully set forth herein, under 35 U.S.C. § 119.

FIELD OF APPLICATION

The present invention relates to an apparatus for fine and controlled adjustment of an injection molding process and related industrial process.

The invention relates in particular to an apparatus for fine and controlled adjustment of a reaction injection molding process, wherein a sealed mold is supplied with fluid reactive resin under high pressure via a supply inlet and by means of a mixing head so as to impregnate with said resin fibers of composite material loaded inside a cavity of the mold and wherein at least one storage container is provided for storing a predefined quantity of residual resin undergoing reaction prior to completion of the injection phase.

The invention also relates to industrial processes of the HPRTM (High Pressure Resin Transfer Molding) type in which injection molding is performed under high pressure.

PRIOR ART

HPRTM processes have been developed recently in automotive environments mainly in order to manufacture components of very high structural and aesthetic quality from composite material, such as carbon fiber, essentially in order to reduce the weight of the support structure of motor vehicles, or the component parts thereof, in view of the urgent need to reduce the use of fossil fuels and the need to build electrically propelled cars.

This technology has become established owing to the need, precisely of car manufacturers, to produce in relatively short periods of time thousands of parts which have the same size and features using a fast and repeatable industrial process.

HPRTM technology was initially widely employed for the production of carbon-fiber based composite material components. For the last thirty years or so these materials have already been known and used in the sports and leisure and aerospace industries and/or in applications for means of transport such as cars and boats which are made, however, using traditional manufacturing methods restricted to the luxury-goods market or small-batch production.

The oldest prior art developed a number of methods which are briefly described below together with their advantages and drawbacks.

A process called "RTM vacuum process" is for example known, this consisting essentially of impregnation with a reactive resin transferred under vacuum.

A composite-material fabric is cut and shaped and suitably divided into layers and then placed in a mold with the desired thickness and in the desired direction. This stack of fabric layers is then encapsulated, being covered with a flexible impermeable sheet which is sealed with mastic along the edges of the mold.

A vacuum is applied to the sheet in order to suck in the resin already mixed with the reagent and prevent the formation of bubbles inside the resin and, via the vacuum, the resin undergoing reaction is also sucked in.

This technique has been applied for example to the manufacture of boats using fiberglass.

Another known technical solution, i.e. PREPREG technology, uses fibers preimpregnated with not yet fully reacted resins. The fibers are preimpregnated using a spreading process performed for each single fabric. According to this process the impregnating resin is semi-solid, but may solidify, reacting when heated to a temperature higher than 100 degrees for example.

In this case also, the preimpregnated fabric is prepared, being cut to shape and arranged in layers inside the mold in the appropriate direction. The fabric is then covered with an impermeable sheet or with a counter-mold which presses it during heating and pressurization inside an autoclave, or using a special press.

Both the technologies described above are not suitable for large-scale production because the reactivity of the resins during the RTM vacuum process is extremely slow, while the PREPREG process requires in any case the use of pre-impregnated material which is very costly and, in addition to the large number of rejects, involves a polymerization time of a few tens of minutes.

On the other hand, an HPRTM process uses layers of non-impregnated, virgin or recycled fiber, which have a base cost and supply cost which is affordable and substantially competitive with that of the RTM vacuum process, but with impregnation and polymerization times which are even two orders of magnitude faster, i.e. a few hundred seconds compared to tens of minutes.

In the HPRTM process as well the fiber must be cut and divided into layers so that it can be preformed inside a half-mold, as in the processes described above.

The HPRTM process, however, makes use of a complete mold which is positioned inside a high-tonnage press.

The mold may be composed of several parts so that it is able to reproduce better the shape of the part to be produced or may be provided with undercuts in order to facilitate extraction. Usually the mold is also provided with extractors and a seal which allows the vacuum to be formed and maintained before injection of the resin.

These industrially used molds are normally equipped with one or more vacuum valves as well as an inlet which is mounted on a mixing and injection head and one or more pressure sensors inside the form.

In the HPRTM process the reactive resins are also mixed by means of a high-pressure jet impingement mixing head and the reactive compound is injected inside the mold cavity in a central position or in any case in a suitable position such as to cover all the fiber inserted therein.

The injection operation lasts from a few seconds to several tens of seconds and the reactive resin spreads from the injection point across the whole fiber until it reaches the more peripheral end of diffusion zones.

While the reactive resin is impregnating the fiber and filling the cavity and recesses, the pressure inside the mold cavity increases at the injection point and in the initial diffusion area. When the reactive resin has filled the whole cavity, a sudden pressure peak is formed, said peak being limited by closing of the mixing head.

The pressure peak has the function of compacting the reactive resin and eliminating any small residual air bubbles which are located in any case in certain peripheral areas where the resin accumulates.

Normally, a pressure sensor, which is installed close to the resin inlet zone, detects the pressure inside the mold cavity and provides the signal for closing the mixing head so as to stop filling and limit the pressure peak to the desired values.

At the same time, the mold is kept at a temperature suitable for accelerating the reaction (for example above 100° C.) and, once injection has been completed, the injected reactive resin starts to polymerize rapidly until it solidifies and forms the mechanical characteristics of the part to be obtained.

Polymerization is also stimulated by the heat generated by the reaction of the resin itself such that the polymerization necessary for removal of the part from the mold, so-called de-molding, is achieved.

Although advantageous in various respects and increasingly likely to be employed in industry, the HPRTM process has however a number of serious drawbacks which limit the application thereof to only application sectors were the components to be produced are very costly.

In fact the process described above is very quick and efficient because it manages to fill the cavity at points which are difficult to reach using conventional processes and because it allows the manufacture of shapes which are complex and must be precisely repeated; however, the high pressure which is reached during the final injection peak requires the use of very precise and well-finished molds, which are very costly, and the use of high-tonnage presses in order to contain the forces developed by the pressures involved during the manufacture of medium-to-large components, which also require a considerable outlay.

A second drawback which is associated with the HPRTM processes of the known type is that of shrinkage of the impregnation resin matrix following polymerization and cooling of the resin mass.

In fact, the resin matrix, during the polymerization reaction, diminishes in volume owing to both crosslinking of the resin itself and the drop in temperature towards the end of the polymerization phase.

The high polymerization temperature and the use of molds with a very precise and complex geometry and perfect surface finish without distortion in any case poses the problem of how to avoid or compensate for shrinkage of the material when polymerization has finished and the part cools down.

The shrinkage of the material may cause even significant distortion in parts with a complex form where the presence of ribs tends to amplify the distortions caused by the shrinkage of the resin matrix, even in the case of very small shrinkage volumes.

It would therefore be desirable to overcome these technological problems on parts which are complex and costly both owing to their complicated geometrical form and the cost of the equipment.

The distortions caused by the shrinkage in volume of the reacted resin may result in major economic costs in particular in the case of complex parts where the preparation of each part requires a lot of labor and dedicated production cycles for cutting and assembling the pieces of carbon-fiber fabric which must be arranged together in layers inside the mold where they must fit perfectly.

The distortion due to the shrinkage in volume, even though very small, normally also gives rise to damage of an aesthetic or even functional nature, since the part produced may have bumps, recesses or distortions, which are often clearly visible against the light, and must therefore be discarded from the set of parts to be mounted on top-of-the-range devices, equipment or motor vehicles.

In the past, in a technical sector related to that of the present invention it has been proposed using molds which are associated with an additional storage space for reactive resin able to be filled during injection into the mold and emptied during polymerization of the resin so as to release an additional quantity of reactive resin and prevent the formation of bubbles or voids. This solution is described for example in U.S. Pat. No. 4,314,955. The storage space is configured substantially as a chamber which houses a piston which is activated towards the end of the mold filling step in order to provide a further supply of reactive resin suitable for compensating for any shrinkage in volume.

Although advantageous in many respects, this solution is incomplete and inadequate for use in the final high-pressure injection-molding operations of modern-day industrial equipment intended for the manufacture of top-of-the-range components.

In fact, a successful result depends on the set-up of the apparatus and does not guarantee a high level of quality which can be maintained over time, also when there are variations in the set-up conditions.

The technical problem underlying the present invention is that of providing an apparatus and related industrial process for allowing fine and controlled adjustment of high-pressure reaction injection-molding processes; said apparatus and said process having respective structural and functional characteristics such as to overcome the drawbacks which hitherto affect the HPRTM processes of the prior art.

Another object of the invention is to provide an apparatus and a process of the aforementioned type able to compensate perfectly for the shrinkage of the resin matrix when it is still fluid and when, during reaction, it undergoes physiological shrinkage of its volume due to the crosslinking phase.

A further object of the invention is to devise a process which may be applied and implemented in an industrial environment at a relatively low cost, while ensuring a very high performance in terms of the quality obtainable for the components produced by means of molding on a large scale.

SUMMARY OF THE INVENTION

The proposed solution forming the basis of the present invention is that of providing a storage device for fluid reactive resin which may be filled during the injection phase, in particular during the final injection of fluid reactive resin into the cavity of the mold for the part or component to be produced, and which may then release under pressure finely adjustable quantities of reactive resin, compensating for the shrinkage in volume during the polymerization phase; this storage device being able to be used under finely adjustable flowrate, temperature and pressure conditions.

On the basis of this proposed solution the technical problem is solved by an apparatus of the type indicated above and characterized in that said storage container or chamber is a cylinder defining internally a storage chamber which houses slidably inside it a plunger operated by an actuator configured as a cylinder/piston assembly arranged as a coaxial extension of said cylinder and comprising an actuating piston having a stem formed with the stem of said plunger; the cylinder of the storage chamber and the cylinder of said actuator having cross-sections different from each other.

Advantageously, moreover, the actuator is controlled by a hydraulic control unit comprising a bypass valve which can be activated so as to place in fluid communication the chambers of the actuator cylinder during controlled dispensing of the stored resin.

A temperature-regulating sleeve is also provided, said sleeve surrounding with predefined play the outer surface of the cylinder defining an interspace inside which fluid is circulated at a predefined temperature so as to control and adjust the temperature inside the storage container.

Advantageously, the storage chamber of said storage container or tank is self-cleaning, being designed as a high-strength steel cylinder with a smooth inner surface and elongated form which defines a stroke five to ten times the diameter of the plunger which slides inside it with predefined play and with suitable sealing gaskets.

More particularly, the plunger has a surface engaging with the cylinder in a precise manner (with a play variable from 5 to 50 micrometers) and provided with a hardening surface treatment and coating as well as sealing rings.

It should be noted that there is a predetermined dimensional ratio between the respective thrust surfaces of the plunger and the actuating piston which may be at least four to twentyfive times greater than the thrust surface of the plunger.

More particularly, the storage container may be configured with relative bore ratios of said plunger and said actuating piston ranging between values of 1:1 to 1:8.

A further embodiment of the present invention relates to mixing and injection head for fine controlling a reaction injection molding process wherein a sealed mold including fibers of a composite material is supplied with fluid reactive resin; comprising:

an outlet of said mixing and injection head to supply an inlet of said mold;
at least a storage tank having an inlet/outlet opening in fluid communication with the outlet of said mixing and injection head to store a residual quantity of resin inside a storage chamber before completion of the injection phase;
said storage tank being structured as cylinder containing said storage chamber and a sliding plunger operated by an actuator;
said actuator being configured as a cylinder/piston assembly arranged in coaxial extension of said cylinder and comprising an actuating piston having a stem formed with the stem of said plunger; the cylinder of the storage chamber and the cylinder of said actuator having different cross-sections.

The technical problem is also solved by a process for fine and controlled adjustment of a reaction injection molding process, wherein at least one sealed mold is supplied with mixed fluid resin under high pressure via a supply inlet and by means of a mixing and injection head so as to impregnate with said reactive resin fibers of composite material loaded inside a cavity of the mold and wherein at least one storage container or tank having an inlet/outlet opening in fluid communication with an outlet of said injection head is provided so as to store a predefined quantity of residual reactive resin prior to completion of the injection phase; characterized in that it comprises the following steps:

activating the storage of reactive resin in said storage tank or chamber when the injection phase is close to the filling of the mold, opening said inlet/outlet opening;
putting said inlet/outlet opening in fluid communication with a storage chamber of a cylinder provided with a sliding plunger driven by an actuator;
keeping at the same time said storage chamber at a regulated temperature;
interrupting the flow of fluid reactive resin from the outlet of said mixing and injection head when a predetermined volume of reactive resin is reached inside said chamber in opposition to the action of said plunger;
releasing into the mold, via said inlet and with finely controlled injection, at least a part of said stored reactive resin in order to compensate for partial shrinkage of the injected resin;
said release of stored reactive resin being performed under controlled pressure by means of said plunger subject to the control of a control unit.

Advantageously, the process envisages controlling the storage of reactive resin by means of a closed control loop with feedback of speed (flowrate) and position (volume) of the self-cleaning plunger.

Moreover, the resin stored under controlled pressure is released by means of operation of the piston connected to the plunger in a regenerative circuit.

Finally, once polymerization has taken place, the residual stored amount of resin (core) in the storage chamber is expelled by means of operation of the pressure plunger and full hydraulic thrust surface of the piston actuating the self-cleaning plunger.

The characteristic features and advantages of the apparatus and the process according to the invention will emerge from the description, provided hereinbelow, of a non-limiting example of embodiment thereof with reference to the accompanying drawings.

DETAILED DESCRIPTION

With reference to these figures, 1 denotes overall and in schematic form an apparatus provided in accordance with the present invention for fine and controlled adjustment of an injection molding process in order to obtain rapid manufacture of parts or components made of composite material.

The invention is particularly suitable for the rapid manufacture of parts with a very high quality in terms of structure and appearance, intended for the motor vehicle sector. The description which follows is provided below with particular reference to this example of embodiment with the aim of simplifying illustration thereof.

The apparatus 1 is associated with a conventional mold 2 inside which a reactive resin mixed under high pressure, for example an epoxy or polyurethane resin, is injected.

The mold 2 is formed by a number of half-shells, not necessarily of the same shape or size. For example, a bottom half-shell 3 may be formed as a bottom three-dimensional mold for the component to be manufactured by means of molding, except for at least one pair of side walls 4' and 4", while a top half-shell 5 may be simply a lid of the mold 2 and form the shoulder for containing said side walls. In a preferred embodiment the side walls of the mold 2 are three segments which form a cylindrical wall.

Figure 8:
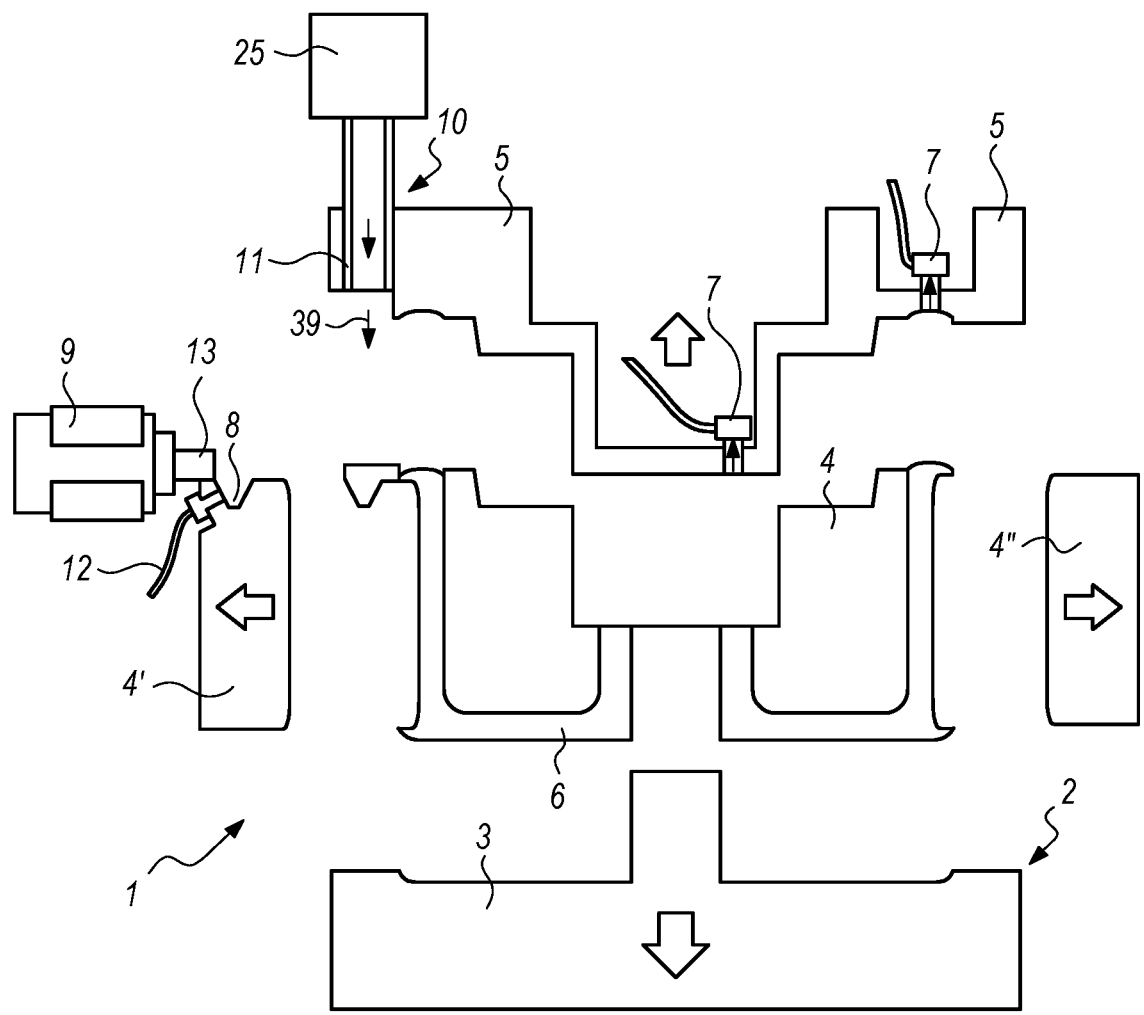
FIG. 8 shows a schematic view of the apparatus provided according to the invention at the end of the injection molding process.
Figure 9:
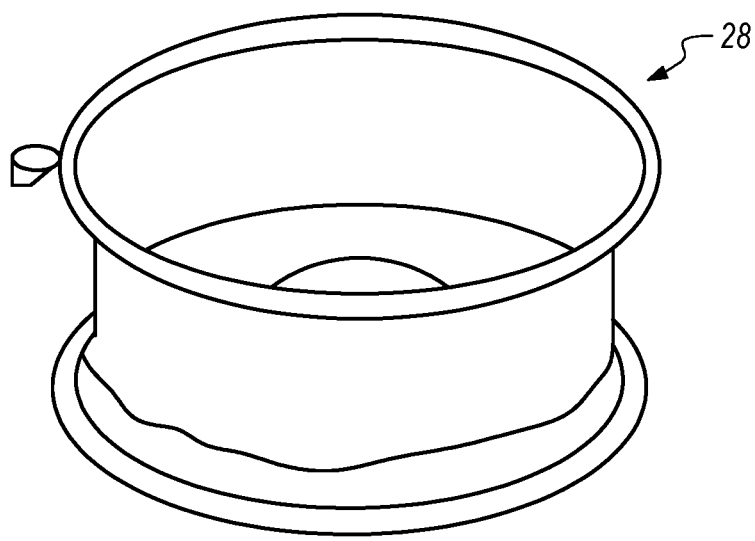
FIG. 9 shows a schematic perspective view of a component produced by means of injection molding using the apparatus according to the present invention.

FIG. 8 shows for example a mold 2 with a bottom base half-shell 3, formed like the base of a ring-shaped element, which together with the side walls 4' and 4" allows a substantially cylindrical form to be obtained, which can be used for example to make wheel rims 28 for motor vehicles, shown for example in FIG. 9. A male insert 4 is also provided for this mold 2 and defines internally an interspace 6 inside which the component 28 is formed. The top half-shell 5 is shaped so as to form a lid which is sealingly fitted onto the cylindrical form composed of the bottom half-shell 3, the side walls 4' and 4" and the male insert 4.

The joining together of the various components of the mold 2, namely the bottom half-shell 3, the side walls 4' and 4", the male insert 4 and the top half-shell 5, results in the formation of an interspace or internal cavity 6 inside which the resin is injected.

The invention relates in particular to a process of the HPRTM (High Pressure Resin Transfer Molding) type which involves firstly the deposition inside the cavity 6 of the mold 2 of layers of fiber, for example virgin or recycled fiber, not yet impregnated, which constitute the structural reinforcing part of the component to be made. This fiber is conventionally cut, shaped and divided into layers so that it can be preformed on the bottom half-mold 3.

According to the HPRTM process the mold 2 is housed and positioned inside a press or in a jig of considerable tonnage, not shown in the drawings since conventional.

As already mentioned, the example described here is provided only by way of a non-limiting example of the rights of the Applicant and does not require a detailed description of the fact that the mold 2 may comprise recesses or also be composed of different parts not shown in the drawings, but intended to define with precision the shape of the part or the component to be produced. The top half-shell 5, which acts as a lid or the internal male insert 4, or the bottom half-shell 3 may have undercut edges and corresponding movable inserts to facilitate extraction of the component 28, while the bottom half-shell 3 is provided both with extractors and with a sealing gasket which allows the vacuum to be formed inside the internal cavity 6 before the resin is injected.

The mold 2 is equipped at the bottom with one or more valves 7 for the vacuum, while at the top it is provided with an inlet 8 on which a mixing head 9 is mounted. In the vicinity of said inlet 8 there are one or more pressure sensors 12 inside the cavity 6.

Also, in the HPRTM process the reactive resins are mixed together by means of the aforementioned mixing head 9 operating at a high impingement pressure and the reactive compound is injected into the cavity 6 of the mold through the inlet 8 so as to be able to cover all the fiber inserted there. Depending on the needs, dimensions and form of the component to be made, it is possible to provide more than one inlet for injection of the reactive resin.

With application of the vacuum the air is removed from the cavity 6 until a negative pressure suitable for performing the subsequent injection of reactive resin is reached (for example an absolute pressure of between 10 and 0.1 millibar).

The injection operation normally lasts from a few seconds to a few tens of seconds and the fluid reactive resin is free to spread from the injection inlet 8 across all the fibers until it reaches the more peripheral end of diffusion zones.

When the reactive resin has impregnated all the fibers previously deposited inside the mold and has filled every cavity or recess, the pressure inside the cavity 6 of the mold increases rapidly owing to the continuous supply of resin introduced by the mixing head and this creates a sudden pressure peak which is limited by closing of the outlet 13 of the mixing head 9.

The pressure peak has the function of compacting the reactive resin and smoothing out any small residual air bubbles which are located in any case in certain peripheral areas where the resin accumulates.

Normally, the pressure sensor 12, which is installed close to the inlet 8 through which the resin is injected, detects the pressure inside the mold cavity 6 and provides a signal for closing the outlet of the injection head 9 so as to limit the pressure peak to desired values.

At the same time, the mold 2 is kept at a temperature suitable for accelerating the reaction (for example higher than 80-100° C.) and, once injection has been completed, the injected reactive resin starts to polymerize rapidly until it solidifies and forms the mechanical characteristics of the part to be obtained. The polymerization phase is preceded by a change in state in which the fluid reactive resin becomes so viscous that it has the appearance of a kind of gel. This state no longer allows the resin to flow inside the fiber and indicates the state of the transformation from the liquid phase to the solid phase.

The polymerization is also stimulated by the heat generated by the reaction of the resin itself such that the polymerization necessary for removal of the part from the mold, so-called de-molding, is achieved. This phase may last from a hundred or so seconds to several minutes.

During the period where the reactive resin matrix is still fluid, i.e. before the so-called "gel time", the resin behaves in the manner of a liquid which gradually increases its viscosity. Before the gel time is reached it is therefore possible to keep the part supplied with further reactive resin under pressure which compensates for shrinkage thereof, but also keeps the whole of the cavity 6 of the mold 2 under pressure so as to eliminate any dispersed gases and obtain ay the end also a suitably attractive surface finish.

Advantageously, according to the present invention, the apparatus 1 is equipped with a storage container or tank or chamber 10 for the fluid reactive resin having an opening 11 forming a storage inlet/emission outlet situated between the outlet 13 of the injection head and the inlet 8 of the mold 2.

This storage container or tank 10 is associated with an actuator 25, for example a fluid cylinder/piston assembly, for example of the hydraulic type for dimensional reasons. However, it is equally well possible to adopt a solution with a cylinder of the pneumatic type or also to use electrically operated actuators, for example screws operated by a gearmotor or recirculating roller screws operated again by a gearmotor.

Figure 1:
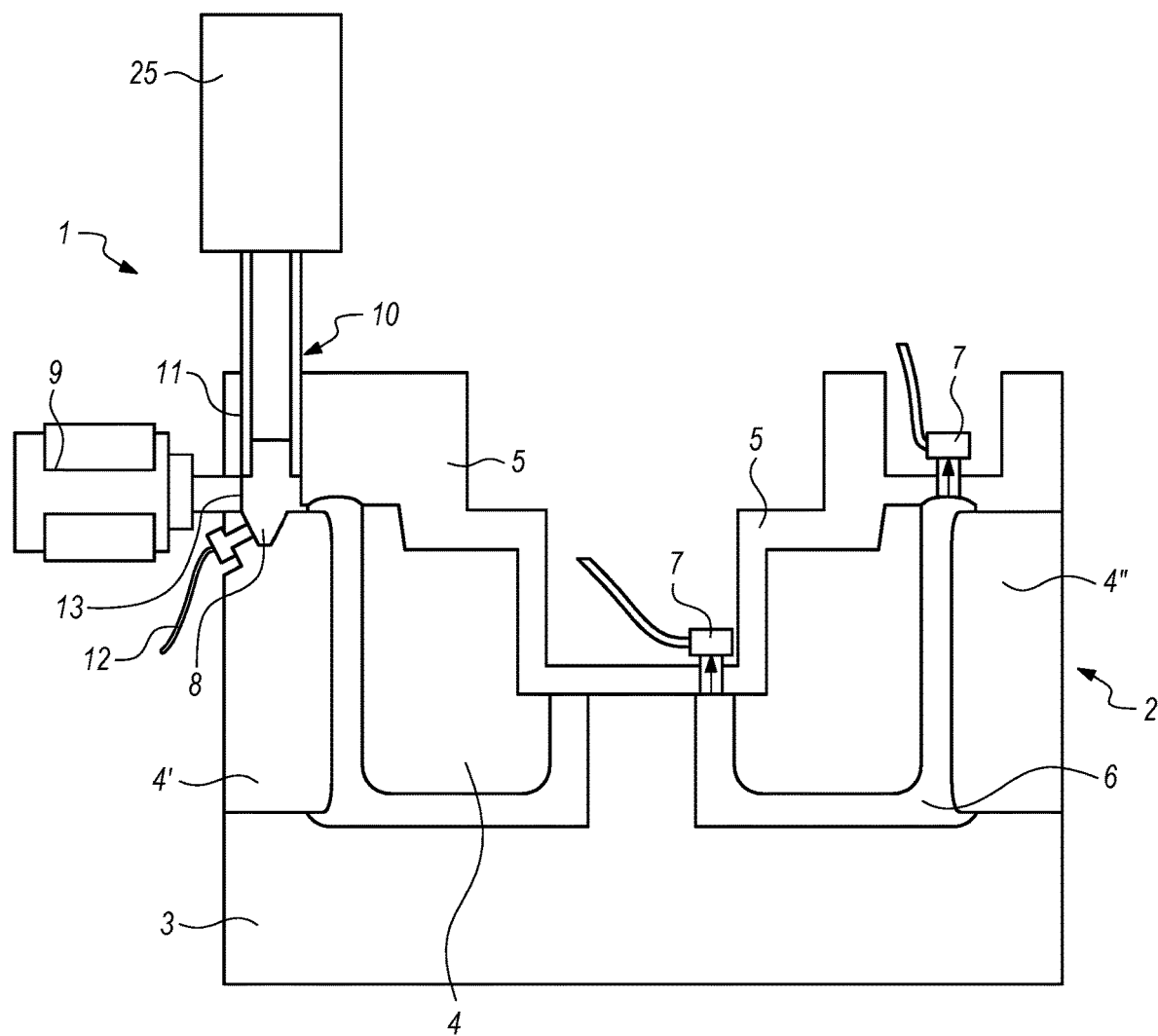
FIG. 1 shows a schematic view of an apparatus provided according to the invention for fine and controlled adjustment of a reaction injection molding process.
Figure 2:
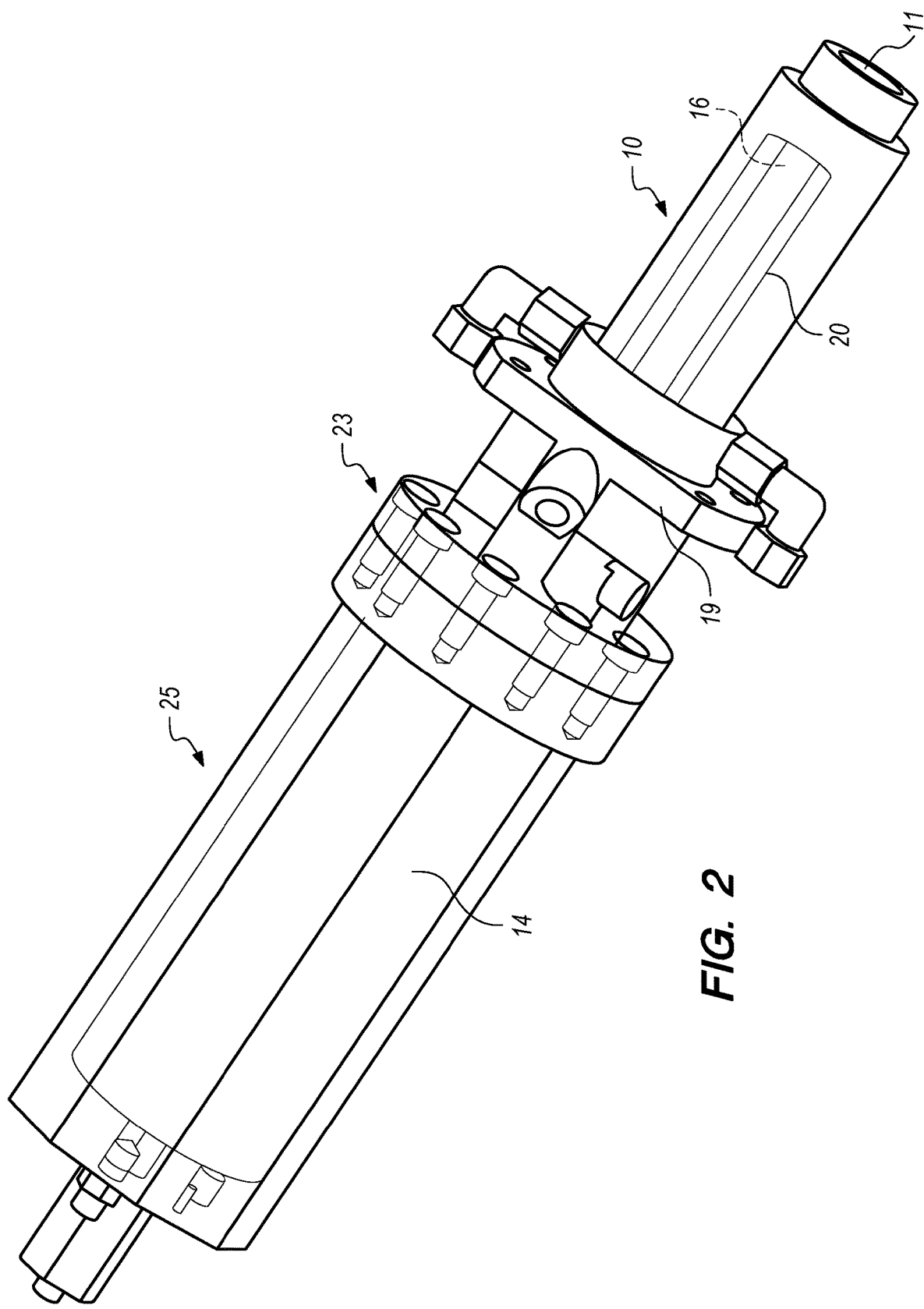
FIG. 2 shows a perspective schematic view of a component of the apparatus according to FIG. 1, more particularly a storage cylinder and an associated hydraulic actuating system.
Figure 3:
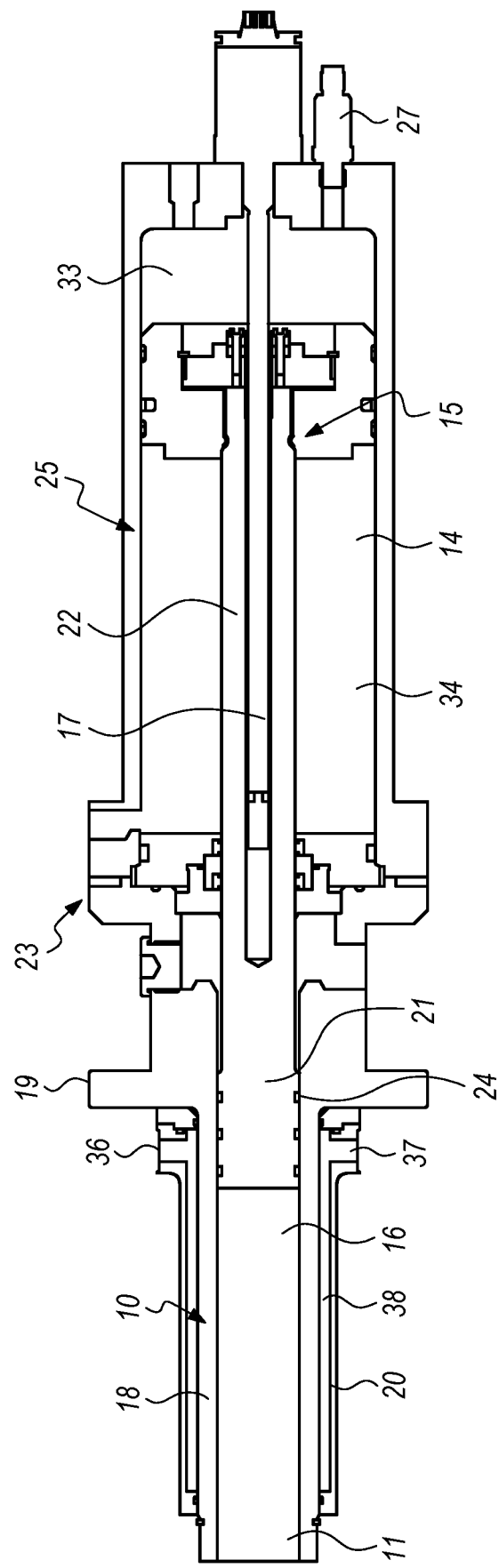
FIG. 3 shows a longitudinally sectioned schematic view of the component according to FIG. 2.

More particularly, with specific reference to the examples shown in FIGS. 2 and 3, it is possible to see how the storage container or chamber 10 takes the form of a metal cylinder 18 defining internally a chamber 16 for storing the reactive resin, which is in turn cylindrical and inside which a storage plunger 21 or piston 21 provided perimetrally with sealing gaskets 24 or rings slides.

The plunger 21 and the storage chamber 16 have surfaces which engage precisely (preferably with play of between 6 and 60 micrometers) and are provided with a hardening surface treatment and coating.

A temperature-regulating sleeve 20 is provided around the cylinder 18 so as to allow adjustment of the temperature inside the storage container or chamber 10. The temperature of the sleeve and the cylinder 18 are monitored by a special sensor.

More particularly, since the reactivity of the reactive resin depends also on its temperature, it is useful to control the temperature of the storage container 10 or the storage chamber 16, keeping it temperature-regulated, or cooled, by means of the temperature-regulating sleeve 20 which surrounds the outer wall of the metal cylinder 18.

This prevents the heat and the temperature of the mold 2 from being transmitted inside the storage container 10 or storage chamber 16 and also the temperature of the reacting resin from starting to increase as a result of endogenous heating due to the reaction, fueling and accelerating in an uncontrolled manner the actual polymerization process.

Advantageously, the sleeve 20 is fitted onto and surrounds with a predefined play the outer wall of the cylinder 18 so as to define an interspace 38 between the inner surface of the sleeve 20 and the outer surface of the cylinder 18. Inlet and outlet openings 36 and 37 are also provided, said openings being connected to a diathermic oil distribution circuit which allows feeding and discharging, i.e. the recirculation of oil at a predefined temperature inside the interspace 38.

The temperature-regulation of the sleeve 20 by means of the supplying and/or discharging of oil inside the interspace 38 is particularly effective for prolonging the working life of the mixed resin, i.e. the time during which the resin may be transferred and moved without causing a deterioration of its properties.

The plunger 21, retracting in a controlled manner inside the chamber 16 of the metal cylinder 18, manages the storage of fluid reactive resin under controlled pressure and flowrate conditions.

The chamber 16 is substantially extended as far as a connecting flange 19 which allows the storage container 10 to be fastened together with the apparatus 1.

The storage container 10 with the storage chamber 16 is associated in a continuous sequence with the cylinder/piston assembly 25 which is arranged so as to extend coaxially with the container 10.

As already mentioned, the cylinder/piston assembly 25 forms the actuator of the storage container 10 and comprises a cylinder 14 and a hydraulic actuating piston 15.

Advantageously, the actuating piston 15 has a stem 22 which coincides substantially with the stem of the plunger 21. Essentially, the actuating piston 15 and the plunger 21 have a common single stem 22 and oppositely arranged heads.

The cylinder/piston assembly 25 is hydraulic and axially aligned with the cylinder 18 of the storage container or chamber 10. A flanged joint 23 is provided for fixing together the cylinders 18 and 14 of the storage container or chamber 10 and the cylinder/piston assembly 25, respectively.

The actuating piston 15, which slides inside the cylinder 14, defines two variable-volume chambers which are controlled by means of pressure transducers.

The stroke of the hydraulic actuating piston 15 and, consequently, that of the plunger 21 are controlled by means of a linear position transducer 17 inserted inside a cavity extending longitudinally inside the stem 22 of the hydraulic piston 15.

The said cavity of the stem 22 also has, installed inside it, on the side where the actuator 25 is situated, a pressure transducer 27 which, together with the linear position transducer 17, allows a PLC-type programmable electronic control unit 30, operating by means of position and speed control loops with a hydraulic control unit, to detect linear displacement signals of the actuator 25 and automatically control the position and the speed of the actuating piston 15 and, consequently, also of the plunger 21 with corresponding adjustment of the pressure and flowrate of the reactive resin stored at each instant.

Advantageously, the cylinder 18 of the storage container or storage chamber 16 is designed so as to be self-cleaning. This particular feature is obtained by means of a basic high-strength steel structure having a particularly smooth inner surface treated with a special coating and an elongated form which defines for the plunger 21 a stroke which is five to ten times the diameter of the said cylinder 18.

The plunger 21, which is slidable inside the cylinder 18, is a member which allows pressure to be generated in the stored reactive resin when it is still fluid, while it is able to scrape and expel from the cylinder 18 also any residual resin which has already reacted and solidified.

The plunger 21 is hydraulically operated by the hydraulic actuating piston 15 to which it is structurally connected by means of the common stem 22. It should be noted that there is also a predetermined ratio between the thrust surfaces of the plunger 21 and the piston 15 and that this ratio is within a range varying from at least 4:1 to at least 25:1.

In other words, the thrust surface of the actuating piston 15 may be from at least 4 to at least twenty five times greater than the thrust surface of the plunger 21. As a result of these different thrust surfaces of the plunger 21 and the piston 15, corresponding essentially to different cross-sections of the corresponding cylinders 18 and 14, it is possible to obtain multiplication of the thrust force exerted by the piston 15.

Preferably, the ratio between the thrust surfaces of the plunger 21 and piston 15 is between 8:1 and 10:1 so as to maintain also good control of the thrust pressure for the fluid reactive resin and avoid pressure peaks resulting from small transients in the management of the oil pressures.

The respective bores of the cylinder 18 and the cylinder 14 also have relative dimensional ratios of between 2:1 and 8:1 so that the actuating piston 15 may develop a suitable thrust pressure once the already reacted resin has been expelled.

For the sake of completeness of the description, a number of dimensional values are provided below purely by way of a non-limiting example.

The stem 22 of both the plunger 21 and the piston 15 have a diameter of 45 mm.

The stroke of the plunger 21 inside the cylinder 18 of the storage container or chamber 10 is 250 mm for a useful storage volume of about 360 cc.

By way of example it is pointed out that preferably the storage container or chamber 10 is configured with relative bore ratios of the plunger 21 and the hydraulic actuating piston 15 ranging between 1:1 and 1:8.

The apparatus according to the invention executes the operations of storage and release of the reactive resin at pressures ranging from 4 to 270 bar depending on the operating steps and the operational storage requirements.

Figure 10:
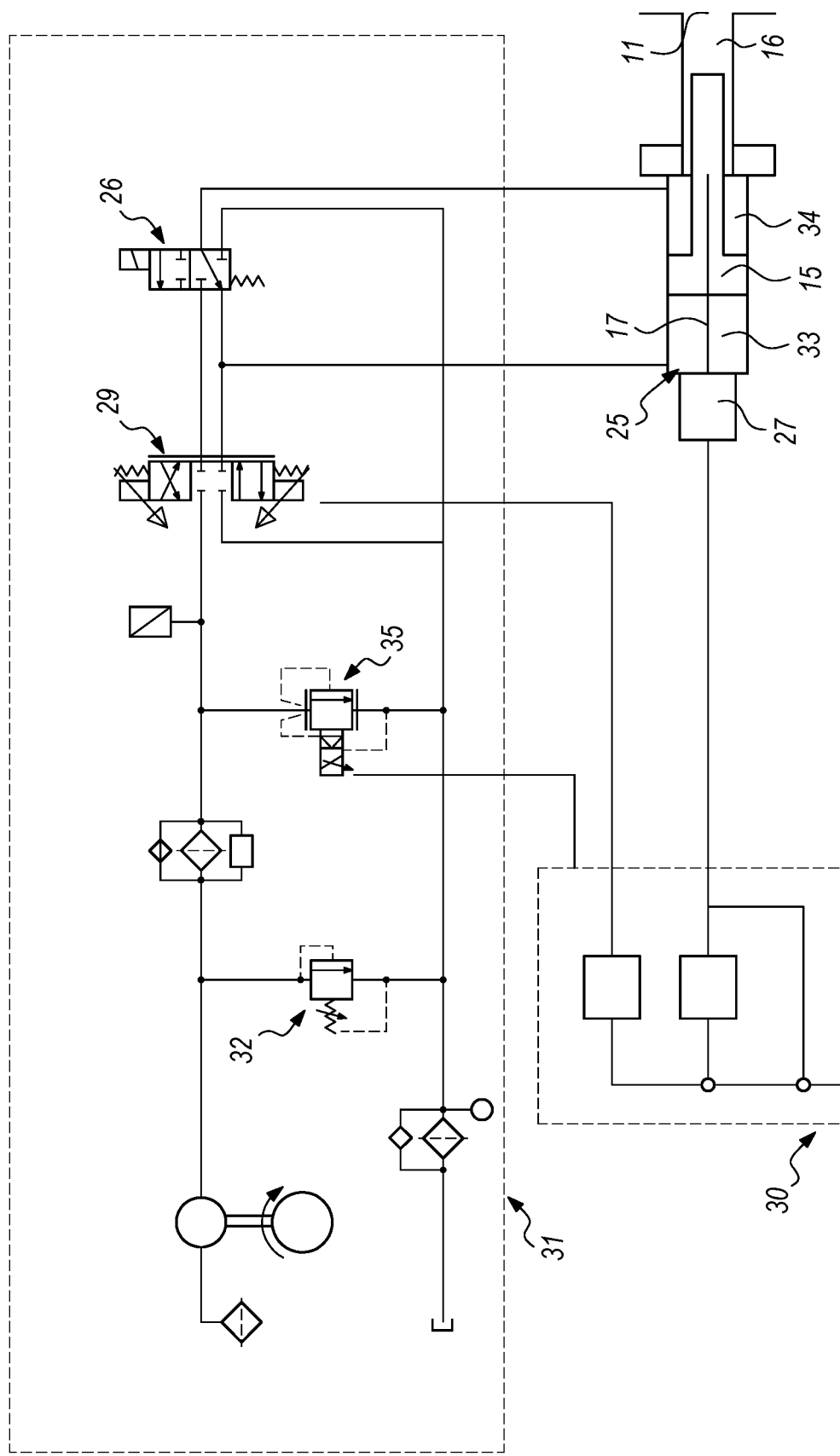
FIG. 10 shows a schematic view of an adjustment and control unit associated with the component of the apparatus according to the invention shown in FIGS. 2 and 3.

The hydraulic actuating piston 15 has instead a bore of 125 mm and is provided with a linear position transducer 17 (which emits a signal of between 4 and 20 mA) controlled by a proportional valve 29 or servo valve mounted on a hydraulic control unit 31 schematically shown in FIG. 10.

The hydraulic actuating piston 15 is supplied by a hydraulic control unit 31 which provides oil under pressure and supplies a flow of oil into the two chambers 33 and 34 of the cylinder 14 separated by the piston 15. The movement of the piston 15 is controlled by means of a servo valve 29, namely a hydraulic distributor with a two-way position-controlled, variable-opening, slider or sliding valve, which performs distribution of the actuating oil with closed-loop control of the position and/or speed of the piston 15 by means of an electromagnetic control system or motor with spring recall, during the position and speed control phases, while other back-up electrovalves 26 and 35 are used for the pressure-controlled movements.

In particular, the circuit for connecting the bypass or regeneration valve 26 to the cylinder 14 performs the movement of the said cylinder with the chambers 33 and 34 hydraulically disconnected during the phases of position control, speed control and expulsion under full pressure of the reacted resin core. The chambers 33 and 34 are instead hydraulically linked together in a so-called regenerative mode during the pressure adjustment standby phases, while the resin is injected into the cavity 6 initially and during filling of this cavity and feeding for controlled supply under pressure of the reactive resin during compensation of the shrinkage inside the mold.

A proportional electrically controlled pressure-regulating valve 35, subject to the control of the control unit 30, regulates the pressure for performing injection of the reactive resin inside the cavity 6 of the mold and for subsequent expulsion of the reacted resin core, all of which as shown in the diagram of FIG. 10.

The maximum flowrate envisaged (during filling of the storage container or chamber 10) is 10 cc/s of resin, equivalent to about 6000 cc/minute of oil.

During storage high pressures are not used for the operating oil, while during injection following shrinkage a pressure of about 50 bar is applied to the operating oil by means of the valve 35 with a flowrate of 5-10 cc/minute (thus performing almost static metering), the chambers 33 and 34 having been placed in fluid communication with each other by means of the valve 26.

With this operating mode, which will be referred to below as "regenerative mode", it is possible to adjust with precision both the final stage of storage of resin inside the chamber 16 and the pressure during release of the resin which flows into the mold.

We shall now consider the industrial process where, according to the invention, the apparatus 1 described above may be used.

Figure 4:
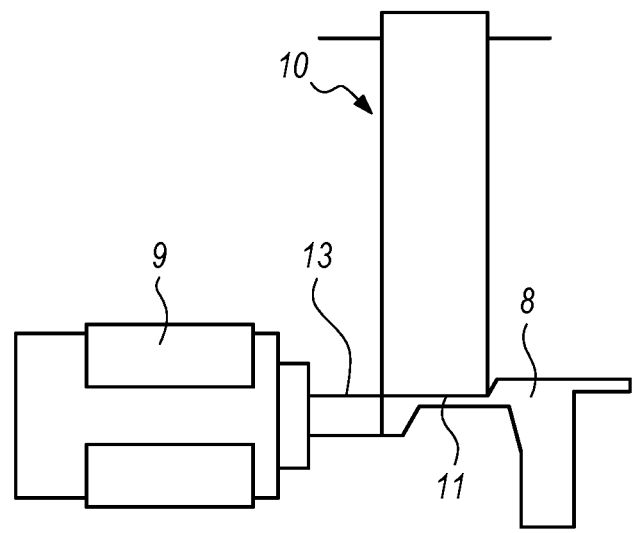
FIGS. 4 and 5 show respective schematic views of a detail of the apparatus according to the invention in two different operating conditions.

Normally the injection of the fluid reactive resin during the HPRTM process terminates when the cavity portion 6 of the mold 2 left free by the fibers is filled and compacted by the resin which flows out of the outlet 13 of the mixing head 9 through the inlet 8 of the mold 2, as shown in FIG. 4.

The end of injection is determined upon reaching a limit pressure (generally of between 30 and 100 bar or more) which has been set by an operator on the basis of his/her experience or calculated on the basis of experimental data predefined according to the configuration of the component to be manufactured.

When the outlet 13 of the mixing and injection head 9 is closed, the fluid reactive resin present in the cavity 6 stops flowing between the fibers and shortly afterwards the chemical reaction starts.

The reacting resin diminishes in density while it is being heated, but soon after the end of injection the gradual formation of the polymer chains causes an increase of the density which—owing to the conservation of the mass inside the system which is now closed—results in a reduction of the volume of resin inside the cavity 6.

If this substantial shrinkage in volume, due to the chemical reaction, were it not to be offset by a simultaneous addition of fresh reactive resin, the part would be subject to the formation of distortions or at least a number of surface irregularities which would negatively affect at least the appearance of the part, especially of the surface fibers are in the form of fabric since at each intersection between weft and warp there is a small volume of resin alone which accentuates the deformation due to shrinkage.

The shrinkage in volume is however a relatively slow phenomenon, which lasts from a few tens of seconds to a few hundred seconds and is proportional to the volume of the reactive resin injected, representing 3-6% thereof, depending on the chemical nature of the resins used.

It is important to note that, in view of the slow nature of the reaction, it would be impossible to inject the reactive resin needed to offset the shrinkage using the same mixing head 9 because the flowrate needed is small and in the region of a few tenths of a gramme per second, which is much less than the minimum flowrate at which the dispensing and mixing process may be performed.

Figure 5:
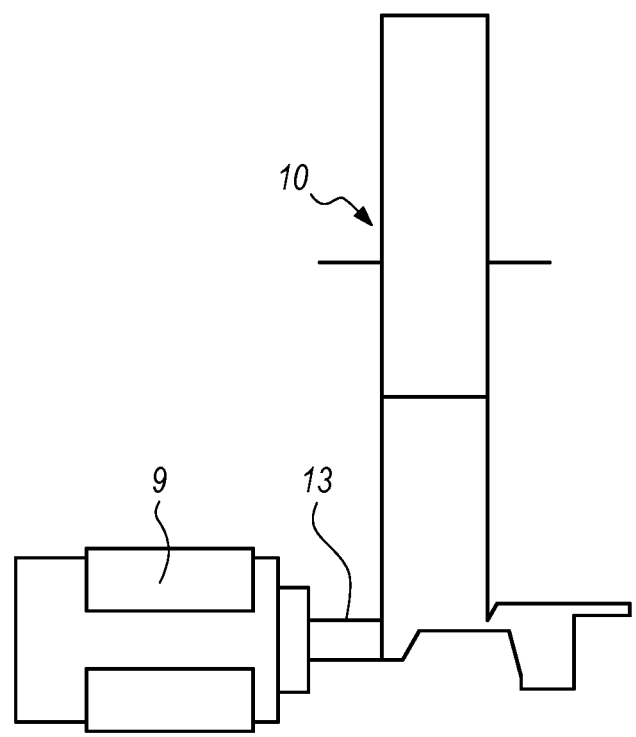

By means of the special feature of the present invention it is possible to solve this technical problem and store a predetermined amount of reactive resin inside the storage container or chamber 10, keeping it in the fluid state until the moment when it may be used, as shown in FIG. 5.

The fluid reactive resin is mixed and stored inside the storage container 10 just before the end of the injection phase, so as to have as long a time interval as possible before this reserve resin starts in turn to react. Also evident in this respect is the special feature of positioning the storage container or chamber 10 as close as possible to the outlet 13 of the injection head 9 upstream of the inlet 8 of the mold 2.

The storage container or chamber 10 has a volume such as to be able to compensate for the maximum shrinkage envisaged for that given component and is configured with a cylindrical extension passed through by an expulsion plunger operated such as to be able to expel the reserve resin even when it has polymerized and hardened.

Figure 6:
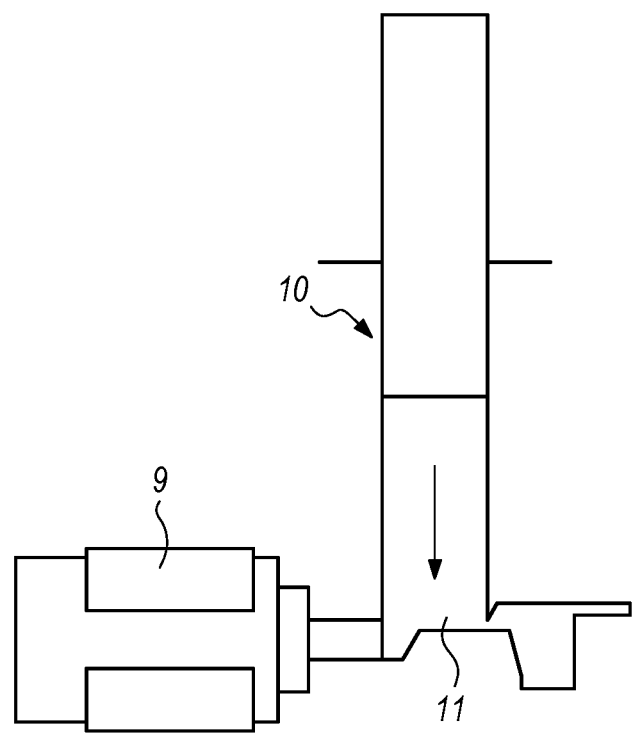
FIGS. 6 and 7 show respective schematic views of the same detail as that of FIG. 4 or 5 in two further different operating conditions.
Figure 7:
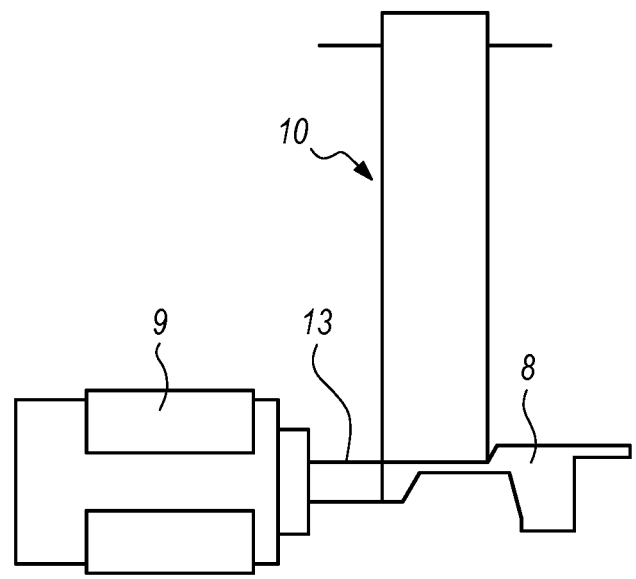

From this storage container or chamber 10 the stored reactive resin is pushed under a controlled pressure and in a nearly static manner towards the cavity 6 of the mold 2, allowing the shrinkage to determine when resin is required, as shown in FIG. 6.

At the end of the controlled-pressure feeding cycle for shrinkage compensation, any residual amount of resin left inside the storage device may polymerize and harden during the time necessary for polymerization of the part inside the mold. In order to expel the polymerized resin the plunger 21 in the storage container or chamber 10 must be able to exert a considerable pressure and the corresponding force needed to detach the reacted resin from the walls, scraping it off and expelling it externally.

In this case the actuating piston 15 operates with the chambers 33 and 34 hydraulically disconnected from each other and with a high operating pressure (up to 200 bar or more) regulated by the valve 35 which adjusts the value thereof necessary for expulsion of the core of reacted resin.

If necessary, several storage containers or chambers may be installed in order to prevent there being an excessive volume of resin stored in one point, something which could also trigger a local polymerization reaction and accelerate it in an uncontrollable manner owing to the generation of endogenous heat. In fact, an excessive increase in the temperature of the reactive resin could cause combustion and/or carbonization owing to the fact that the resin is contained inside a closed vessel.

This potential danger is avoided in one case by means of the fact that the storage container or chamber 10 has a relatively small volume and is provided with a temperature-regulating sleeve 20 or else by adopting several storage containers or chambers intended to divide up the reserve amount of reactive resin stored.

Now, with particular reference to FIG. 10, which is a schematic view of a hydraulic control unit 31, subject to the control of an electronic control unit 30, intended to adjust the actuator 25 and consequently the storage container or chamber 10, the process for metering the reserve amount of reactive resin is described.

The injection molding cycle is started by means of mixing of the components of the reactive resin inside the high-pressure mixing head 9 with consequent injection of the reactive resin inside the cavity 6 of the mold 2 through the outlet 13 of the head 9 and the inlet 8 of the said mold.

At the start of the cycle the storage container or chamber 10 is totally empty and in the closed position, with the plunger 21 fully extended towards the inlet 11, as shown in FIG. 4.

It is advantageous that, at the start of injection of the reactive resin inside the mold, there is no storage of resin so as not to draw on the supply of resin which flows freely inside the mold and into the fibers without any particular fluid dynamic resistance. Moreover it is not desirable to store reactive resin at the start of the injection step since it could start to react in advance unnecessarily.

The plunger 21 is therefore kept at a controlled pressure preventing the undesirable entry of reactive resin inside the storage container or chamber 10 through the opening 11.

The pressure of the oil inside the hydraulic actuator 25 must be sufficient to counteract the pressure inside the mold 2 during the initial injection phase, whereby its value may be determined as being for example up to 50 bar on the thrust surface of the plunger 21. Therefore the thrust pressure preset by means of the pressure control valve 35 and the connected chambers 33 and 34, forming part of the regenerative circuit, is used so as to improve the adjustment setting of the pressure for counteracting the thrust of the resin.

The temperature of the sleeve 20 must be such as to keep the resin sufficiently hot, but not activate hardening thereof, for example within values of between 50 and 110° C., preferably between 80 and 100° C.

Once injection has been started, the electronic control unit 30 calculates the amount of reactive resin injected and— depending on the data entered, obtained from previous experimental data—activates the hydraulic control unit 31 so as to allow the storage of reserve resin inside the chamber 16 of the container 10. This step is activated only when a predefined percentage amount of resin is needed to fill the mold 2 or when a certain pressure is reached inside the mold, with the aim of storing a predetermined amount of resin inside the chamber 16.

The entire movement of the stem 22 is subject to the movement of the actuator 25.

An automatic procedure, associated with the control unit 30, via a corresponding programmable PLC, manages both the controlled speed of displacement and the displacement position of the actuating piston 15, using the feedback of the position transducer 17. In other words, a speed or flowrate feedback closed loop or alternatively a position/volume feedback closed loop of said plunger is performed.

During this phase no major pressures should be acting on the surface of the plunger 21 and the storage container or chamber 10 should only counteract the pressure inside the mold under the action of the servo valve 29 driven at retraction speed, namely at a rate for performing storage.

Storage is performed with the chambers 33 and 34 hydraulically disconnected from each other and is carried out for example at a controlled speed, for example 5 cc/s, in accordance with a value set in the control unit 30, until a stored quantity which can be set by the operator or calculated by the control unit on the basis of the injection parameters and the characteristics of the resin is reached.

The speed may increase over time, if for example it is required to lower further the rate of injection into the mold and keep the counter-pressure at the mold inlet low. This pressure is therefore a pressure which is formed at the injection inlet 8 as a result of the flow resistance of the reactive resin in the fibers.

Once the pressure for end of injection inside the mold has been reached and storage of the quantity of fluid reactive resin preset for practically near filling of the mold has been completed, the outlet 13 of the head 9 is closed and the polymerization phase starts.

The control signals of the unit 30 therefore enable the actuator 25 to be driven by means of the hydraulic control unit 31 and the proportional valve 29 so as to move with a high degree of precision the actuating piston 15 and, consequently, the plunger 21 of the storage container or chamber 10.

The movement of the plunger 21 of the storage container 10 inside the chamber 16 is in turn stopped and the control unit 30 switches from position control to pressure control.

During this phase an associated bypass or regeneration valve 26 is activated so as to supply the oil at the same pressure as the reactive resin inside the cylinder 18 of the storage container or chamber 10; otherwise it would be more difficult to perform controlled dispensing for storage at the low pressures due to the relative bore ratios of the pistons of the cylinders 14 and 18.

The bypass or regeneration valve 26 is a valve which, if activated, places in communication the two chambers 33, 34 of the hydraulic actuating piston 15. In this way the regenerative configuration is activated.

If the two chambers 33, 34 are in fluid communication, the oil pressure acts on both the sides of the head of the actuating piston 15 and the result is that the hydraulic pressure is exerted only on a surface area equivalent to that of the stem 22; in this manner the movement forwards is faster for the same oil flowrate.

In our case, the fluid bypass between the chambers 33 and 34 in the regenerative configuration results in operation at higher oil pressures than that which would be necessary without regeneration in order to maintain the same pressure in the stored reactive resin, allowing the pressure regulating valve 35 of the control unit 31 to work better.

In this regenerative configuration and mode, the stem 22 is controlled to produce a thrust by means of "fully forwards" operation of the proportional valve 29 at a stable pressure of about 50 bar max. Test data have shown that this is the optimum value.

The nearly static controlled-thrust injection phase lasts for up to a few minutes (optimum value also obtained from tests) and in any case is terminated before the resin cross-linking time.

The storage device operates maintaining, in regenerative mode, a certain pressure on the plunger 21 of the storage container or chamber 10 so as to push the reserve reactive resin into the mold 2 at a desired pressure set by means of the valve 35, in general at the end-of-injection pressure and in any case at a pressure not higher than the design pressure of the mold.

At this pressure, the storage container or chamber 10 will supply the reactive resin which is required in each case as shrinkage of the polymerized resin inside the mold produces empty volumes.

At the end of the process for release of the stored reactive resin, the resin still present inside the storage chamber 16 will in turn start to harden and must be expelled from the storage container or chamber 10 after opening of the mold.

At the end of the crosslinking time, or a few minutes thereafter, it is possible to raise the temperature of the oil which heats the sleeve 20 of the storage container or chamber 10 in order to promote crosslinking of the residual resin inside the storage container or chamber 10 at the end of the molding cycle for the component to be made.

This temperature could also coincide with that of the mold, which may be increased by 10° C. This is necessary so as not to have to wait for crosslinking of the resin left inside the storage container or chamber 10 when the part inside the mold 2 is instead already ready for extraction.

Before opening the mold 2, the thrust on the stem of the plunger 21 must be eliminated, with the valves closed.

The control circuit is set to the configuration with the chambers 33 and 34 disconnected by means of the valve 26.

The stem 22 remains in the position it has in that moment.

As soon as the mold 2 is opened, the temperature of the oil inside the sleeve 20 is lowered to a temperature preset before the control phase, namely a temperature of between 80 and 100° C.

The operator, once the mold 2 has been opened and the correct position of the inlet/outlet 11 of the storage container or chamber 10 checked, starts the cycle for expulsion of any plug 39 or core of residual reacted resin (visible in FIG. 8) which has now hardened and remained stuck inside the opening 11.

The plug 39 may be very short, if the entire procedure has been carried out correctly, or may be much longer, even as long as the entire stroke of the plunger 21, if the procedure has been interrupted or stopped suddenly in the even of an emergency.

The regeneration or bypass valve 26 is deactivated and the pressure of the oil is then set to high values by means of the proportional valve 35. During this phase the oil pressure could also reach 150 bar and advancing of the stem 22 at a low speed is started until the plug 39 of hardened resin has been expelled.

During expulsion of the residual plug 39 of hardened resin, at the end of the cycle, hydraulic pressures of up to 200 bar may be present at the moment when the plug is detached, but with a very low speed.

Finally, the plunger 21 is operated so as to produce a thrust expelling the residual resin by means of the force generated by the pressures set by means of the valve 35 over the whole surface of the piston 15, but controlling its speed by means of the servo valve 29.

The plunger 21 of the cylinder 18 is pushed forwards fully and will then return into the end-of-stroke position, namely with the storage chamber 16 empty, ready for the next cycle.

From the above description it is clear how the apparatus and the process according to the invention solve the technical problem and achieve numerous advantages which are indicated hereinbelow.

The control system by means of the programmable electronic unit 30 converts the position signal of the sensor 17 into a signal for speed variation (namely variation of position over time) and closes both a speed and a position control loop.

By using a regenerative circuit, with the chambers 33 and 34 of the cylinder 14 in fluid communication with each other, it is possible to perform pressure control of the storage operation both during a final filling phase and during release since it activates a small thrust cross-section.

However, by deactivating the regenerative mode and using a full hydraulic thrust cross-section, the core 39 of hardened resin which may have remained stuck inside the chamber 16 may be expelled.

By means of the position control performed by means of the control servo valve 29 and two valves, i.e. the pressure control valve 35 and the pressure limiting valve—the first valve being set low for pressure controlled release and the other valve being set high for expulsion of the residual plug 39—, the actuator 25 may be effectively operated in two different modes depending on storage or release of the reserve resin.

As a result of the special feature of providing the cylinder-type storage container, injection of the reactive resin inside the cavity 6 of the mold 2 may be performed at flowrates much slower than the minimum flowrate which can be obtained by the injection mixing head 9.

Towards the end of injection, when practically all the fibers are impregnated, the totality of the viscous friction of the flow of the reactive resin through the fibers may increase significantly and, if the flowrate of the reactive resin is not reduced, there is the risk that the fibers may be physically displaced ("fiber flush") with a consequent loss of the desired mechanical and appearance properties of the part, if important.

As already described, the high-pressure mixing and injection head 9 imposes a limitation of the minimum flowrate below which the epoxy system is neither mixed nor dispensed in an optimum manner, and therefore it is not advisable to lower the flowrate below the "fiber flush" limit.

By suitably controlling the operation of the storage container or chamber 10 reactive resin may be injected inside the mold at flowrates lower than that of the minimum mixing flowrate using two modes:

- a first more direct mode which consists in storing an excess amount of reactive resin and injecting it subsequently by controlling simply the stored amount;
- a second mode which consists in performing filling of the storage container or chamber 10 by drawing off flow from the injection phase so that mixing is performed at the slowest possible rate needed for correct operation and so that for example 20 to 90% of the minimum flow is absorbed as a storage flow, thus avoiding fiber displacement.

By suitably controlling operation of the storage container or chamber 10 it is possible to maintain a total flowrate of reactive resin which is as low as possible (for example 10 g/s), indispensable for obtaining mixing by means of the turbulence induced by the jets, and nevertheless inject reactive resin at the flowrate which does not cause fiber displacement, by causing resin to be drawn off by the storage device (at a rate for example of 8 g/s), therefore reducing the flowrate through the fibers to only 2 g/s.

Obviously these modes may be implemented only for as long as the storage container or chamber 10 is not completely filled, at which point injection must be stopped.

The storage flowrate may therefore vary over time depending on the requirements.

The invention claimed is:

1. Apparatus for fine and controlled adjustment of a reaction injection molding process, comprising:
    a sealed mold supplied with fluid reactive resin via a supply inlet;
    a mixing and injection head structured to impregnate with said resin fibers of composite material loaded inside a cavity of the mold;
    at least one storage container having an inlet/outlet opening in fluid communication with an outlet of said injection head to store a predefined quantity of residual resin inside a storage chamber before completion of the injection phase;
    said storage container being a cylinder defining internally a storage chamber which houses a slidable plunger operated by an actuator configured as a cylinder/piston assembly;
    said actuator being arranged as a coaxial extension of said cylinder and comprising an actuating piston having a stem coinciding with the stem of said plunger; the cylinder of the storage chamber and the cylinder of said actuator having cross-sections different from each other;
    wherein the storage chamber of said storage container is self-cleaning, being designed as a high-strength steel cylinder with a smooth inner surface and elongated form which defines a stroke five to ten times the diameter of the plunger which slides inside it with predefined play and with suitable sealing gaskets; and
    wherein said cylinder/piston assembly is of the hydraulic type and the stroke of the actuating piston and consequently that of the plunger are controlled by means of a linear position transducer inserted inside a cavity extending longitudinally inside the common stem of the piston and plunger.

2. Apparatus according to claim 1, characterized in that said actuator is driven by a hydraulic control unit associated with an electronic control unit and comprising a bypass valve which can be activated so as to place in fluid communication chambers of the cylinder of the actuator during controlled dispensing of the stored resin.

3. Apparatus according to claim 2, characterized in that said hydraulic control unit also comprises a proportional-control pressure regulating valve activated during controlled dispensing of the stored resin and during the initial phase of injection as a pressure storage safety element preventing an excessive increase in the pressure of the injected resin.

4. Apparatus according to claim 1, characterized in that said cylinder is provided with a temperature-regulating sleeve surrounding with predefined play the outer surface of the cylinder defining an interspace inside which fluid is circulated at a predefined temperature so as to control and adjust the temperature inside the storage container.

5. Apparatus according to claim 1, characterized in that there is a predetermined dimensional ratio between the respective thrust surfaces of the plunger and the actuating piston and this ratio may be at least four to at least twenty five times greater than the thrust surface of the plunger.

6. Apparatus according to claim 1, characterized in that said storage container is configured with relative bore ratios of said plunger and said actuating piston ranging between values of 1:1 to 1:8.

7. Apparatus according to claim 1, characterized in that the respective bores of the cylinder of the cylinder/piston actuator and of the cylinder of the storage container have relative dimensional ratios of between 1:2 and 1:8 so that said actuating piston may develop a thrust pressure suitable for expulsion of the already reacted resin.

8. A mixing and injection head for fine controlling a reaction injection molding process wherein a sealed mold including fibers of a composite material is supplied with fluid reactive resin; comprising:
    an outlet of said mixing and injection head to supply an inlet of said mold;
    at least a storage tank having an inlet/outlet opening in fluid communication with the outlet of said mixing and injection head to store a residual quantity of resin inside a storage chamber before completion of the injection phase;
    said storage tank being structured as cylinder containing said storage chamber and a sliding plunger operated by an actuator;
    said actuator being configured as a cylinder/piston assembly arranged in coaxial extension of said cylinder and comprising an actuating piston having a stem formed with the stem of said plunger; the cylinder of the storage chamber and the cylinder of said actuator having different cross-sections;
    wherein the storage chamber of said storage tank is self-cleaning, being structured as a high-strength steel cylinder with a smooth inner surface and elongated form which defines a stroke five to ten times the diameter of the sliding plunger; and
    wherein said cylinder/piston assembly is of the hydraulic type and the stroke of the actuating piston and consequently that of the plunger are controlled by means of a linear position transducer inserted inside a cavity extending longitudinally inside the common stem of the piston and plunger.

9. The mixing and injection head of claim 8, wherein said actuator is driven by a hydraulic control unit associated with an electronic control unit and comprising a bypass valve which can be activated to place in fluid communication chambers of the cylinder of said actuator during controlled dispensing of the stored resin.

10. The mixing and injection head of claim 9, wherein said hydraulic control unit further comprises a proportional-control pressure regulating valve activated during controlled dispensing of the stored resin and during the initial phase of injection as a pressure storage safety element preventing an excessive increase in the pressure of the injected resin.

11. The mixing and injection head of claim 10, wherein said storage tank is configured with relative bore ratios of said plunger and said actuating piston ranging between values of 1:1 to 1:8.

12. The mixing and injection head of claim 8, wherein said cylinder is provided with a temperature-regulating sleeve surrounding with predefined play the outer surface of the cylinder defining an interspace inside which fluid is circulated at a predefined temperature to control and adjust the temperature inside the storage container.

13. The mixing and injection head of claim 8, wherein a predetermined dimensional ratio is set between the respective thrust surfaces of the plunger and the actuating piston and this ratio may be at least four to at least twenty five times greater than the thrust surface of the plunger.

14. The mixing and injection head of claim 8, wherein the respective bores of the cylinder of the cylinder/piston actuator and of the cylinder of the storage tank have relative dimensional ratios of between 1:2 and 1:8 so that said actuating piston may develop a thrust pressure suitable for expulsion of the already reacted resin.

15. The mixing and injection head of claim 8, wherein the stem of the actuating piston is integrally formed with the stem of said plunger.

\* \* \* \* \*